United States Patent
Gaubatz et al.

(10) Patent No.: US 7,155,058 B2
(45) Date of Patent: Dec. 26, 2006

(54) SYSTEM AND METHOD FOR AUTOMATICALLY DETECTING AND CORRECTING RED EYE

(75) Inventors: Matthew D. Gaubatz, Boxborough, MA (US); Robert A. Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 854 days.

(21) Appl. No.: 10/131,173

(22) Filed: Apr. 24, 2002

(65) Prior Publication Data

US 2003/0202105 A1 Oct. 30, 2003

(51) Int. Cl.
*G06L 9/00* (2006.01)
(52) U.S. Cl. .................................... 382/167
(58) Field of Classification Search ........ 382/162–165, 382/167, 115, 117–118, 274–275, 282–283, 382/224–225; 358/517–520, 527, 1.9; 348/77–78, 348/576–577, 370–371, 560; 359/487, 483–485
See application file for complete search history.

(56) References Cited

U.S. PATENT DOCUMENTS

| | | | |
|---|---|---|---|
| 5,432,863 A * | 7/1995 | Benati et al. | 382/167 |
| 5,748,764 A * | 5/1998 | Benati et al. | 382/117 |
| 5,900,973 A | 5/1999 | Marcellin-Dibon et al. | 359/467 |
| 6,009,209 A | 12/1999 | Acker et al. | 382/275 |
| 6,016,354 A | 1/2000 | Lin et al. | 382/117 |
| 6,172,714 B1 | 1/2001 | Ulichney | 348/560 |
| 6,278,491 B1 | 8/2001 | Wang et al. | 348/370 |
| 6,292,574 B1 * | 9/2001 | Schildkraut et al. | 382/117 |
| 6,631,208 B1 * | 10/2003 | Kinjo et al. | 382/167 |
| 6,728,401 B1 * | 4/2004 | Hardeberg | 382/167 |

OTHER PUBLICATIONS

Gaubatz et al., Automatic Red-Eye Detection and Correction, IEEE 0-7803-7622-6/02, pp. 1-8041-807.*

U.S. Appl. No. 09/992,795 No. filed, Nov. 12, 2001, Michael J. Jones et al.

Crow, Franklin C., Summed-Area Tables for Texture Mapping, Computer Graphics, Jul. 1984, pp. 207-212, vol. 18, No. 13.

Xin, Z., Yanjun, Xu and Limin, DU, Locating facial features with color information, ICSP '98 Proceedings, vol. 2, (c) 1998, pp. 889-892.

Rowley, H., Baluja, S. and Kanade, T., Neutral Network-Based Face Detection, IEEE Transactions on Pattern Analysis and Machine Intelligence, Jan. 1998, pp. 23-38, vol. 20, No. 1.

Schneiderman, H. and Kanade, T., A Statistical Method for 3D Object Detection Applied to Faces and Cars, IEEE International Conference on Computer Vision, (c) 2000.

(Continued)

*Primary Examiner*—Jose L. Couso
*Assistant Examiner*—Ishrat Sherali

(57) ABSTRACT

A system and method automatically detects and corrects the occurrence of red-eye in digital photographs and images without user intervention. The system includes a face recognition and locator engine for locating human faces within the image and for generating a bounding box around each face. A red-eye locator engine analyzes the pixel data for each bounding box and computes one or more predefined metrics. The preferred metrics include color variation, redness, redness variation and glint. The red-eye locator engine also generates one or more detection masks based upon the computed metrics, and searches the detection mask for an occurrence of red-eye. A red-eye correction engine receives the detection mask including the detected occurrences of red-eye, and generates a correction mask. Pixels identified as being occurrences of red-eye are then de-saturated in accordance with the correction mask.

20 Claims, 11 Drawing Sheets

OTHER PUBLICATIONS

Zhang, L. and Lenders, P., Knowledge-Based Eye Detection for Human Face Recognition, Fourth International Conference on Knowledge-Based Intelligent Engineering Systems & Allied Technologies, 2000 Proceedings, vol. 1, (c) 2000, pp. 117-120.

Rizon, M. and Kawaguchi, Automatic Eye Detection Using Intensity and Edge Information, TENCON 2000 Proceedings, vol. 2, IEEE, (c) 2000, pp. II-415-II-420.

Kawaguchi, T., Hidaka, D. and Rizon, M., Detection of Eyes from Human Faces y Hough Transform and Separability Filter, ICIP 2000 Proceedings, vol. 1, IEEE, (c) 2000, pp. 49-52.

Yang, M., Roth, D. and Ahuja, N., A SNoW-Based Face Detector, Neural Information Processing 12, (c) 2000.

McClellan, J., Parks, T. and Rabiner, L., A Computer Program for Designing Optimum FIR Linear Phase Digital Filters, IEEE Transactions on Audio and ElectroAcoustics, vol. AU-21, No. 6, Dec. 1973, pp. 506-526.

\* cited by examiner

SYSTEM AND METHOD FOR AUTOMATICALLY DETECTING AND CORRECTING RED EYE

BACKGROUND OF THE INVENTION

1. Field of the Invention

This invention relates to digital image processing and, more specifically, to a system and method for automatically detecting and correcting occurrences of red-eye in images.

2. Background Information

Many cameras include a built-in flash for taking photographs or images in low ambient light conditions. The flash, which is activated at the same time that the camera's shutter is opened, provides sufficient light so as to prevent the resulting image from being under-exposed. Many cameras also include a light detector and can thus automatically determine when the flash is needed. As a result, these cameras are able to produce high quality images in otherwise low ambient light conditions.

However, when photographing people in low ambient light conditions, the use of a flash often results in the occurrence of "red-eye". Red-eye is the appearance in the resulting image of an unnatural red hue in a person's eyes, most often in the pupils. Red-eye is caused by light from the flash reflecting off blood vessels in the back of the person's eyes. Furthermore, because a person's pupils are often dilated in low ambient light conditions, large and very noticeable occurrences of red-eye often appear in images taken in such conditions. In many cases, the appearance of red-eye is severe enough to ruin the image.

One method of eliminating or reducing red-eye is to provide a large lens to flash distance. More specifically, if the angle between the camera and the source of the flash, as measured from the subject being photographed, is sufficiently large (meaning there is a large distance between the camera's lens and the flash), red-eye can be eliminated. Obviously, this is not a viable solution for pocket cameras that have a built-in flash as the lens to flash distance must be small to keep the size of the camera down.

Another method of reducing red-eye, which is employed in many pocket cameras, is to contract the person's pupils before the image is taken by activating the flash one or more times before the image is taken. The flash is then activated again when the image is actually taken by the camera. This approach nonetheless has several drawbacks, the most significant of which is the resulting drain on the camera's battery caused by multiple activations of the flash for each image being taken. Indeed, because of this drain on the battery, most flashes operate in a default, single flash mode, and must be actively switched by the user into a red-eye mode in order to cause the flash to activate before the image is taken. Users, however, often forget to switch the flash's operating mode before taking an image in low light conditions, thereby ending up with an image having occurrences of red-eye.

In addition to changing the flash's operating mode, there are also several products is available for correcting red-eye in existing images. These products typically operate on electronic, i.e., digital, representations of the images. Today, the use of digital cameras, which capture images digitally, are wide-spread. In addition, scanners convert conventional photographs into digital formats. Digital or electronic images can be opened and viewed on most computer platforms, such as personal computers. Current red-eye correction software products, such as Photoshop® and PhotoDeluxe® from Adobe Systems, Inc. and PhotoDraw from Microsoft Corp. of Redmond, Wash., require a user to first display the image on his or her computer's monitor. In some of these products the user manipulates a pointing device, such as a mouse, to "paint" over the occurrences of red-eye in the displayed image. In other products, the user must precisely locate the center of the pupils so that the software can place black circles over them. Correction of red-eye using these products is often time-consuming and user-intensive. In addition, the results are often poor, sometimes looking even worse than the original occurrences of red-eye.

U.S. Pat. No. 6,278,491 to Wang et al. is directed to an "Apparatus and Method for Automatically Detecting and Reducing Red-Eye in a Digital Image". The system of the '491 patent utilizes a face/eye detector to locate faces and/or eyes in a subject image. It then searches candidate eye regions or windows within the located faces and/or eyes for any red pixels. These red pixels are then changed to a different color or hue, such as monochrome. Although the system of the '491 patent purportedly works without user-intervention, it nonetheless has several drawbacks. First, it is believed that the system of the '491 patent is computationally intensive, i.e., consumes significant processor and memory resources. Second, it is believed that the system of the '491 patent suffers from both false positives, i.e., identifying and correcting artifacts that are not in fact occurrences of red-eye, as well as false negatives, i.e., failing to identify or correct actual occurrences of red-eye. This may be due to the fact that red-eye artifacts are identified based solely on redness.

It is also believed that the system of the '491 patent is unable to detect and/or correct occurrences of red-eye in partially opened eyes, occurrences of red-eye that are combined with other red artifacts (such as red skin), or occurrences of red-eye that do not encompass the selected candidate eye regions or windows. In addition, the system of the '491 patent appears to be limited to detecting and correcting occurrences of red-eye solely in pupils. That is, it cannot detect or correct occurrences of red-eye in other parts of the eye, such as the iris or the schlera, i.e., the white portion of the eye, which sometimes occurs. Accordingly, a need exits for a system that can detect and correct a wide variety of red-eye occurrences automatically, i.e. without user intervention, and that can do so efficiently.

SUMMARY OF THE INVENTION

Briefly, the present invention relates to a system and method for automatically detecting and correcting the occurrence of red-eye in digital images. The system includes a face recognition and locator engine for identifying human faces in a subject image being processed. For each identified face, the face recognition and locator engine generates a bounding box enclosing the respective face. The system further includes a red-eye locator engine that analyzes the data corresponding to pixels disposed within the bounding box and computes one or more predefined metrics. In the illustrative embodiment, the predefined metrics include color variation, redness, redness variation and glint. The red-eye locator engine also generates a detection mask based upon each of the computed metrics. Utilizing the masks generated for the one or more predefined metrics, the red-eye locator engine determines whether or not an occurrence of red-eye exists within the bounding box. The system further includes a red-eye correction engine that receives the detection mask indicating the occurrence of red-eye, and generates a candidate red-eye box around each detected occurrence of red-eye. The red-eye correction engine generates a correction mask by evaluating luminance profiles and the redness metric values of the pixels within the candidate red-eye boxes. Pixels within the candidate red-eye boxes are then de-saturated in accordance with the correction mask values. The system thereby generates an output image that corresponds to the input image, but whose detected occurrences of red-eye have been corrected.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
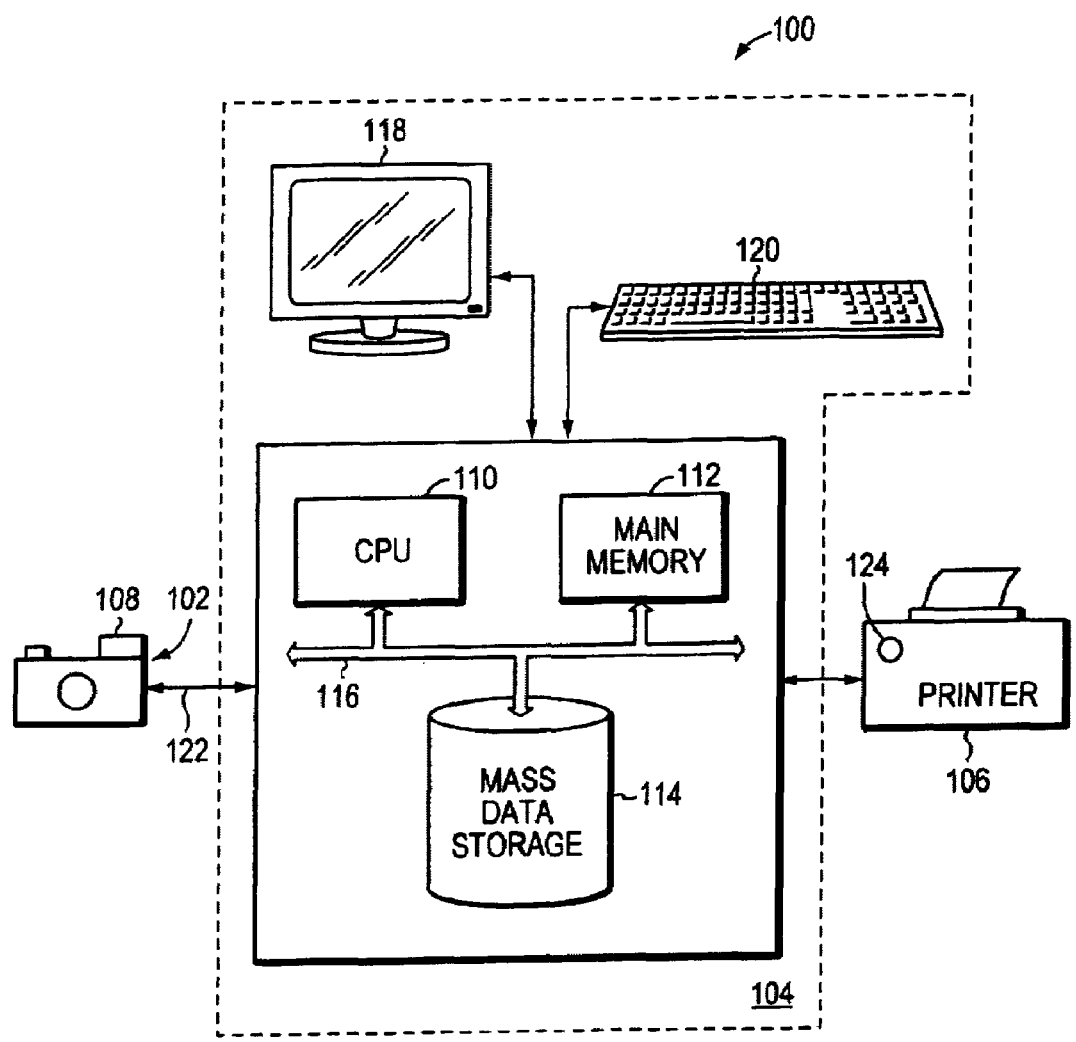
FIG. 1 is a highly schematic illustration of a computer environment including the present invention.

FIG. 1 is a highly schematic representation of an illustrative computing environment 100 for use with the present invention. The computing environment 100 preferably includes a digital camera 102 for capturing photographs or images in digital format, a computer platform 104 and a printer 106. The camera 102 includes a built-in flash 108 that can be used in low ambient light conditions. The computer platform 104 preferably includes one or more processors, such as Central Processing Unit (CPU) 110, a main memory 112 and a mass data storage unit 114 interconnected by a bus 116. It further includes a display screen 118 and one or more input devices, such as keyboard 120 and a mouse (not shown).

Suitable computers for use as the computer platform 104 include the Presario and/or Deskpro series of desktop computers from Compaq Computer Corp. of Houston, Tex., and the Power Mac series of computers from Apple Computer Inc. of Cupertino, California, among others. Executing on computer platform 104 is an operating system, such as one of the Windows operating systems from Microsoft Corp. of Redmond, Wash., one of the Mac OS operating system from Apple Computer Inc., or a UNIX operating system. Those skilled in the art will recognize that other computer platforms may also be utilized, such as the Presario and/or Armada series of laptop computers from Compaq Computer Corp., as well as UNIX-based computer workstations.

The camera 102 may be detachably coupled to the computer platform 104 as illustrated by arrow 122 so that digital images captured by the camera 102 can be downloaded and stored in the computer platform 104, such as at the mass data storage unit 114. The printer 106 is also coupled to the computer platform 104, e.g., through a parallel port (not shown), so that images stored at the computer platform 104 can be printed. The printer 106, moreover, preferably includes one or more processing elements (not shown) similar to CPU 110 as well as one or more memory elements (not shown) similar to main memory 112 and/or mass data storage unit 114.

Those skilled in the art will recognize that there are many ways of transferring digital images captured by camera 102 to computer platform 104, including without limitation storing them on a permanent or reusable medium, such as flash cards, floppy disks, compact disks (CDs), etc. Furthermore, camera 102 could be coupled directly to printer 106 in order to print captured images directly from the camera 102 and/or printer 106 could include a CD and/or flash card drive for receiving images.

Figure 2:
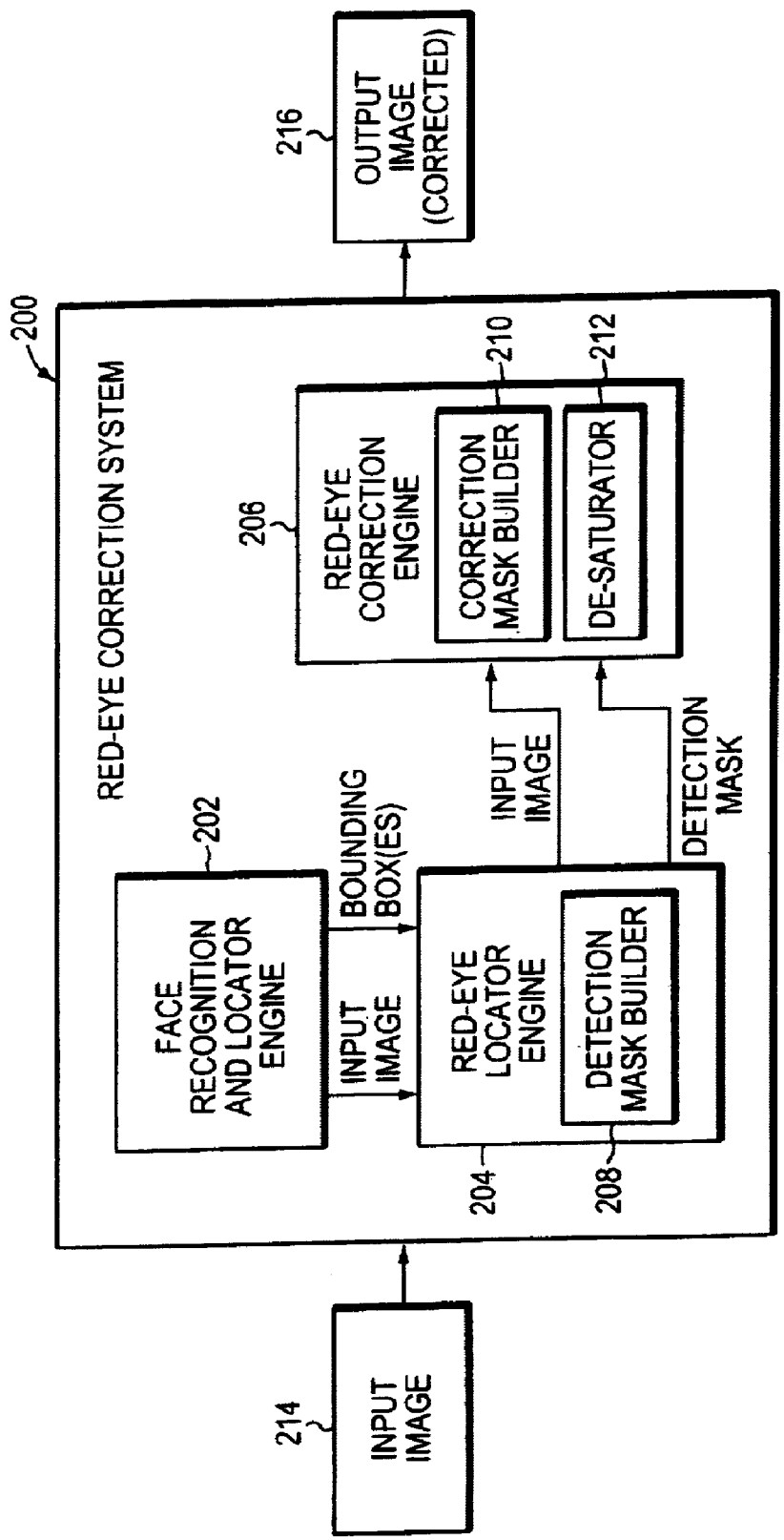
FIG. 2 is a highly schematic, functional block diagram of the present invention.

FIG. 2 is a highly schematic, functional representation of a red-eye correction system 200 in accordance with the present invention. System 200 includes a face recognition and locator engine 202, a red-eye locator engine 204 and a red-eye correction engine 206. The red-eye locator engine 204 has one or more detection mask builders 208, and the red-eye correction engine 206 includes one or more correction mask builders 210 and a de-saturator 212. As described in more detail herein, a digital color input image 214 is received and processed by system 200, which generates a digital color output image 216 whose detected occurrences of red-eye have been corrected.

It will be understood by those skilled in the art that system 200 may comprise registers and combinational logic configured and arranged to produce sequential logic circuits. In the illustrated embodiment, system 200 is preferably implemented through one or more software modules or libraries containing program instructions pertaining to the methods described herein that can be stored at the memories 112, 114 of either the computer platform 104 or the printer 106, and that are executable by either CPU 110 or the one or more processing elements of printer 106. Other computer readable media may also be used to store and execute these program instructions. Nonetheless, those skilled in the art will recognize that various combinations of software and hardware, including firmware, may be utilized to implement the present invention.

In a preferred embodiment, the red-eye correction system 200 is incorporated into the printer 106. That is, the printer 106 includes sufficient processing and memory resources to execute the programming instructions corresponding to the present invention. The printer 106 may include a red-eye correction button 124 (FIG. 1) that can be selected, e.g., pressed, by a user in order to activate the red-eye correction system 200. Upon activation, the red-eye correction system 200 preferably processes every color image received by the printer 106 in the manner described herein. That is, the system 200 searches for and identifies any faces within a received image, searches those faces for occurrences of red-eye and corrects any detected occurrences of red-eye.

The input image 214 comprises a plurality of pixels that can be considered, as least logically, to be organized in an array or matrix having a plurality of rows and columns. In other words, each pixel has an x-coordinate, which identifies the particular column within which the pixel is located, and a y-coordinate, which identifies the particular row within which the pixel is located. Thus, each pixel can be identified by its unique x, y coordinates. In addition, each pixel contains digital data which may be in the well-known Red, Green, Blue (RGB) color space. Specifically, each pixel may have eight bits of data in the Red plane (i.e., values 0–255), eight bits of data in the Blue plane (i.e., values 0–255) and eight bits of data in the Green plane (i.e., values 0–255). Output image 216 has the same number of pixels organized in the same array or matrix as the input image 214 and may also be in RGB color space. As described herein, in the output image 216, those pixels from the input image 214 that were identified as corresponding to occurrences of red-eye are corrected, while all other pixels from the input image 214 remain unchanged. Suitable file formats for the input and output images 214, 216 include the well-known JPEG, BMP and GIF file formats, among others.

Figure 3A:
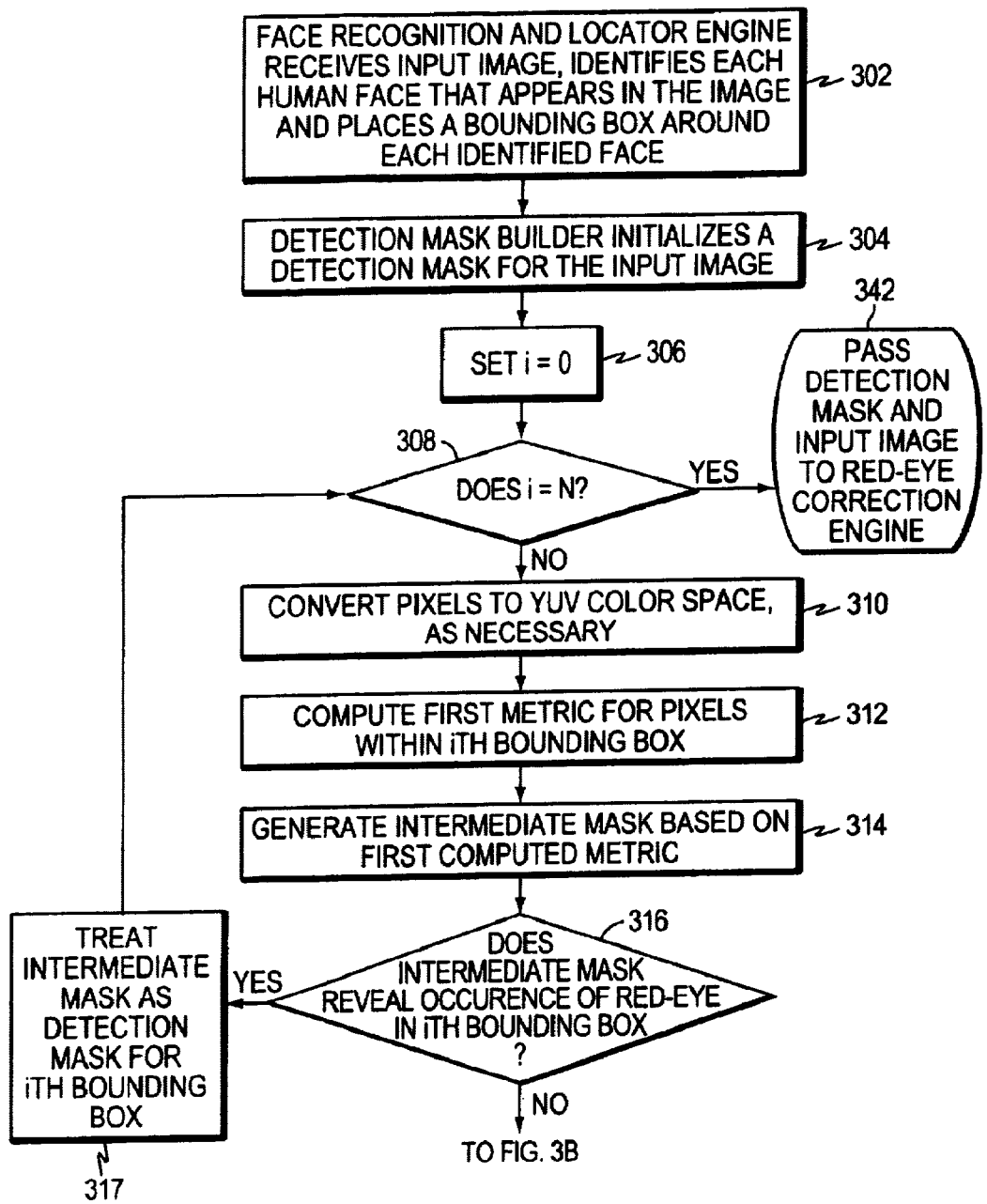
FIGS. 3A–C, 6A–B and 7 are flow diagrams in accordance with the method of the present invention.
Figure 3B:
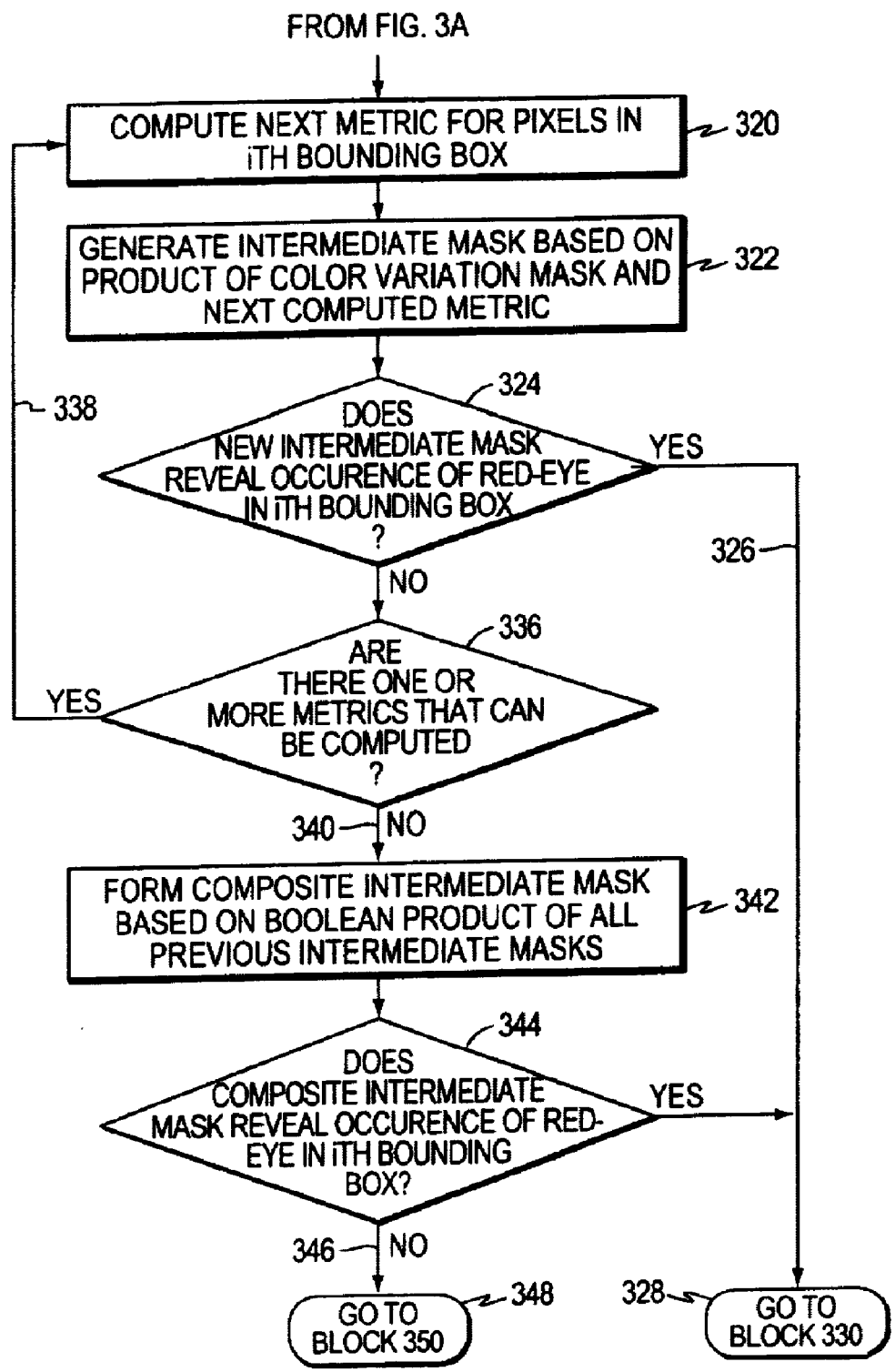
Figure 3C:
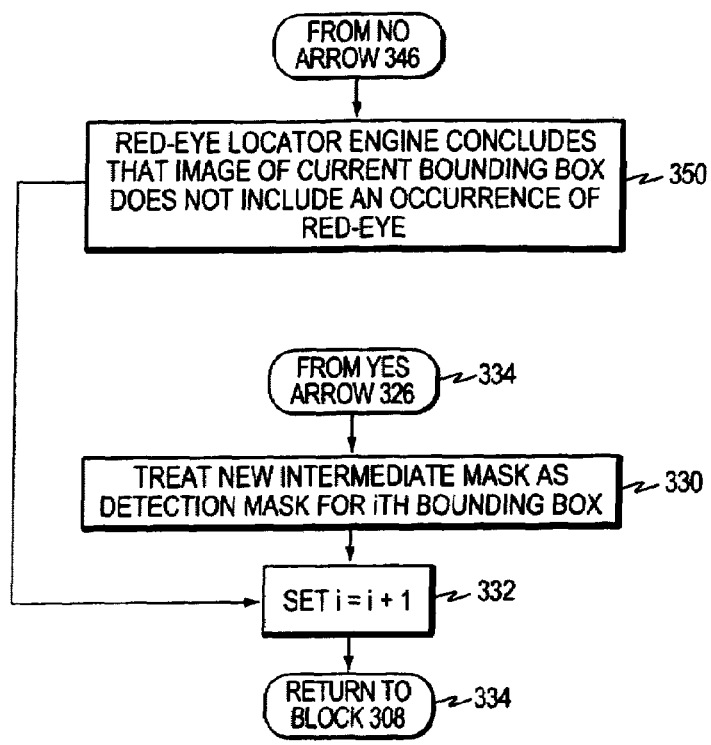

FIGS. 3A–C are a flow diagram of the method of the present invention. First, the face recognition and locator engine 202 receives and processes the input image 214, as indicated at block 302. Specifically, engine 202 searches through the input image 214 identifying each human face located therein. The face recognition and locator engine 202 also generates a bounding box surrounding or encompassing each identified face, as also indicated at block 302.

Figure 4:
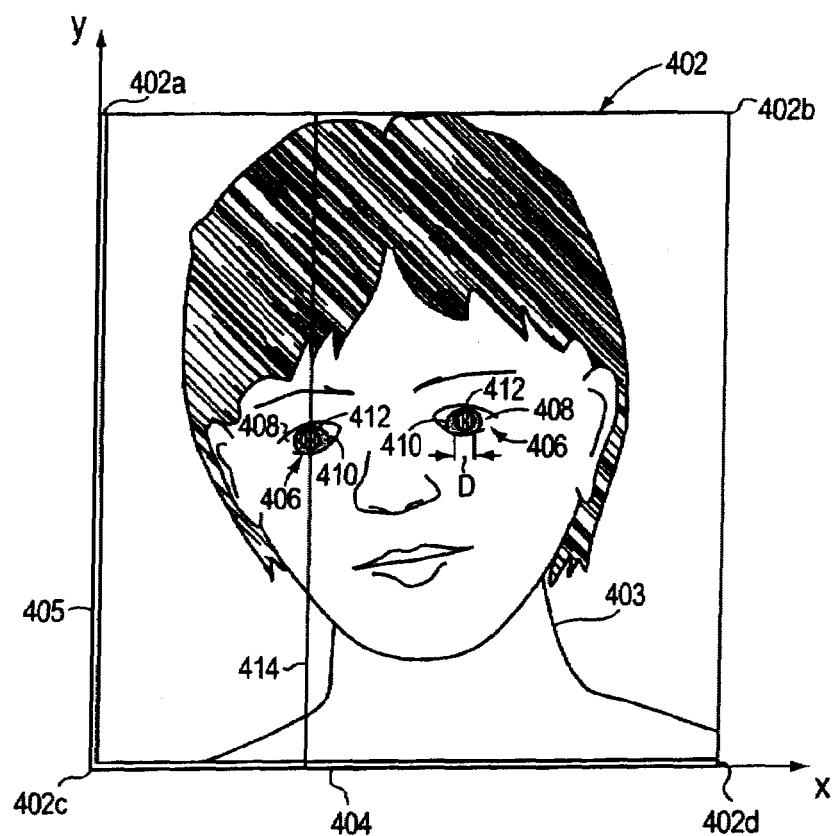
FIG. 4 is a highly schematic illustration of a portion of an input image being processed.

FIG. 4 is a highly schematic representation of a bounding box 402 encompassing a face 403 detected by engine 202 in the input image 214. Box 402 has four corners 402a–d. As indicated above, each pixel within the bounding box 402 has or is otherwise associated with an x-coordinate value and a y-coordinate value. That is, box 402 may be oriented with respect to an x,y coordinate system as illustrated by x-arrow 404 and y-arrow 405, whose intersection may be at the box's lower left corner 402c. The face 403 typically has two eyes 406. Each of which comprises a schlera 408, an iris 410 and a pupil 412. The original input image 214 along with each bounding box 402 are supplied to the red-eye locator engine 204. Engine 202 may specify the bounding box 402 by providing the red-eye locator engine 204 with the x,y coordinates of the box's four corners 402a–d. In the preferred embodiment, the face recognition and locator engine 202 operates in accordance with the method and apparatus described in commonly owned U.S. patent application Ser. No. 09/992,795, filed Nov. 12, 2001 by Michael Jones and Paul Viola for a METHOD AND SYSTEM FOR OBJECT DETECTION IN DIGITAL IMAGES, which is hereby incorporated by reference in its entirety as if fully set forth herein. Nonetheless, those skilled in the art will recognize that the invention may be used with other systems designed to recognize human faces in images, such as the systems described in H. Rowley, S. Baluja, T. Kanade, "Human Face Detection in Visual Scenes" (Carnegie Mellon University, November 1995), or in U.S. Pat. No. 5,164,992 to Turk et al. for a "Face Recognition System", issued Nov. 17, 1992.

It should be understood that the face recognition and locator engine 202 may rotate the input image 214 so as to produce a number of corresponding rotated images. Each of the individual rotated images may be separately processed to identify any human faces.

Next, the detection mask builder 208 of the red-eye locator engine 204 initializes a detection mask for the input image, as indicated at block 304. The detection mask has a data point or mask value for each pixel of the input image 214 and is preferably organized as an array or matrix that conforms in size and shape to the input image 214. Each mask value is preferably one-bit and thus may either be asserted, e.g., set to binary "1", or de-asserted, e.g., set to binary "0". The detection mask is preferably initialized by de-asserting all mask values, e.g., setting all mask values to "0".

To process all of the identified faces, the red-eye locator engine 204 may set a variable, i, to zero, as indicated at block 306, then test to see if the variable equals the number of faces, N, identified by the face recognition and locator engine 202, as indicated at decision block 308. If not, then there is at least one more face 403 within a corresponding bounding box 402 to be analyzed by the red-eye locator engine 204. As described herein, engine 204 analyzes each bounding box 402 by computing one or more metrics for at least some if not all pixels within the bounding box 402, and by generating an intermediate mask for each computed metric. If the intermediate mask resulting from the first computed metric reveals an occurrence of red-eye, then the red-eye locator engine 204 proceeds to analyze the next bounding box, if any. If not, the red-eye locator engine 204 computes one or more additional metrics to assist in the identification of red-eye occurrences. That is, the present invention does not rely on a single metric to identify occurrences of red-eye in all instances. The metrics that are computed by the red-eye locator engine 204 include: color variation, redness, redness variation and glint; and they are preferably computed in this order.

As indicated above, the term "red-eye" refers to an unnatural red hue or color appearing in one or both of the eyes of a person appearing in a photograph or image. Although the unnatural red hue typically appears in the eye's pupils, it may also or alternatively appear in the iris and/or schlera.

Assuming there is at least one bounding box 402 still to be processed, the response to decision block 308 is No and the red-eye locator engine 204 converts the data format of the pixels located within the subject box 402 to the luminance-chrominance color space, such as YUV or YCrCb, as necessary, as indicated at block 310. Oftentimes, the input image 214 will be in the Red, Green, Blue (RGB) color space, and thus the conversion is from RGB to luminance-chrominance. It should nonetheless be understood that the input image 214 may be in formats other than RGB, such as Cyan, Magenta, Yellow, Black (CMYK), YIQ, or Hue, Saturation, Value (HSU), among others. In the preferred embodiment, the pixels of the bounding box are converted to YCrCb color space, and reference herein to either YUV or YCrCb shall be construed to mean any luminance-chrominance color space. Methods for converting from RGB to YUV are well-known to those skilled in the art and thus need not be described here. Engine 204 next computes the first metric for the pixels of the subject bounding box 402, as indicated at block 312. The first metric is preferably color variation.

Color Variation Metric

It has been found that occurrences of red-eye are often characterized by sharp changes in both luminance and chrominance within a small area. Luminance refers to the amount or intensity of light, e.g., the lightness of reflecting objects or the brightness of self-luminous objects, such as computer monitors. Chrominance basically refers to hue or color. Chrominance information includes red-green chrominance, Cr, and a blue-yellow chrominance, Cb. The color variation metric, which is designed to measure such changes, is preferably computed for each pixel as follows. For each pixel within the subject bounding box 402, consider a patch of pixels surrounding the pixel. The patch is preferably a square whose size is selected so as to correspond to the expected size of a pupil given the size of the bounding box 402. For example, if the bounding box 402 has a height, H, in pixels and a width, W, in pixels, then the patch is preferably W/20 pixels on each side, and this patch is centered at the pixel being analyzed. A mean pixel is then calculated in YUV color space considering all of the pixels contained within the patch. That is, the Y, the U and V values for all of the pixels in the patch are averaged, thereby producing a mean Y value, a mean U value and a mean V value for the patch. Next, the squared distance, in YUV color space, is determined between the subject pixel and the calculated mean pixel for the patch, with respect to some norm. Consider these YUV triples as vectors:

$$r_{subject \atop pixel} = \left( Y_{subject \atop pixel} \ Cr_{subject \atop pixel} \ Cb_{subject \atop pixel} \right), r_{mean \atop pixel} = \left( Y_{mean \atop pixel} \ Cr_{mean \atop pixel} \ Cb_{mean \atop pixel} \right)$$

In this notation, the squared distance in a vector norm can be computed by the following:

$$\left\| r_{subject \atop pixel} - r_{mean \atop pixel} \right\|_A^2 = \left( r_{subject \atop pixel} - r_{mean \atop pixel} \right)^T A \left( r_{subject \atop pixel} - r_{mean \atop pixel} \right)$$

where A is a positive-definite matrix. This value provides a measure of how different the pixel being analyzed is from the pixels in the surrounding patch. Suitable values for A include diagonal matrices designed to emphasize difference change in the appropriate color. In the Euclidean norm (A=I), for instance, the squared distance can be determined from the following equation:

$$\left\| r_{subject \atop pixel} - r_{mean \atop pixel} \right\|_I^2 = \left( Y_{mean \atop pixel} - Y_{subject \atop pixel} \right)^2 + \left( Cr_{mean \atop pixel} - Cr_{subject \atop pixel} \right)^2 + \left( Cb_{mean \atop pixel} - Cb_{subject \atop pixel} \right)^2$$

Once the squared distance values have been determined for the pixels in the bounding box 402, engine 204 next considers a region of pixels around one or more pixels in the bounding box 402. A region, unlike the patch described above, is preferably circular in shape and selected to be the size of an eye, i.e., the sclera. The size of the patch is preferably a function of the width of the bounding box 402. In the preferred embodiment, the radius of the patch is set to 0.05 times the width of the box 402, and is centered on the pixel being analyzed. An average of the previously computed squared distance values for all pixels within the region is then determined, and this average is the "color variation" value for the pixel at the center of the region. This process, e.g., the selection of a region and the computation of a squared distance average of the pixels in the region, is preferably repeated for each pixel in the bounding box 402, thereby producing a color variation metric value for each pixel within the box 402.

The above-described process of determining a color variation metric value for a pixel of coordinates (x,y) is given by the following equation:

$$\text{Color Variation}(x, y) = \frac{1}{|R_{x,y}|} \sum_{r \in R_{x,y}} \left\| r - \frac{1}{|P_r|} \sum_{p \in P_r} p \right\|^2$$

where p is a pixel in the pupil-sized patch, $P_r$, that is centered on pixel r, and r is a pixel in the eye-sized region, $R_{x,y}$, which is centered on the pixel having coordinates x,y.

Once a color variation value is determined for at least some but preferably all of the pixels within the bounding box 402, the red-eye locator engine 204 generates an intermediate mask, as indicated by block 314. The intermediate mask has a 1-bit intermediate mask value for each pixel in the bounding box 402, and the intermediate mask is preferably organized as an array or matrix that conforms in size and shape to the box 402. To generate the intermediate mask, the color variation values are preferably normalized so as to fall within the range of 0.0 to 1.0. Next, each normalized color variation value is compared against a color variation threshold. In the preferred embodiment, the threshold is in the range of 0.5 to 1.0, is preferably about two-thirds, and is more preferably 0.6. For each pixel from the bounding box 402 whose computed color variation value exceeds the threshold, e.g., 0.6, the corresponding mask value is asserted, e.g., set to "1". For those pixels whose computed color variation values are equal to or below the threshold, the corresponding mask value is de-asserted, e.g., set to "0".

Figure 5:
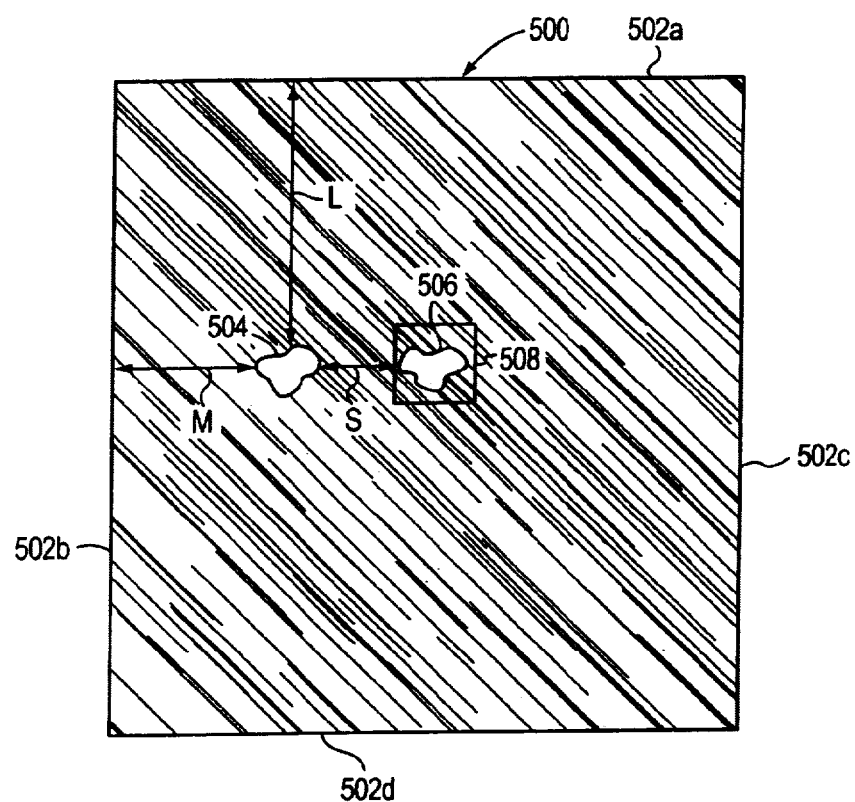
FIG. 5 is a highly schematic illustration of a mask created for the image of FIG. 4.

Engine 204 in cooperation with the correction mask builder 208 then evaluates the mask to see whether it reveals any occurrences of red-eye, as indicated by decision block 316. FIG. 5 is a highly schematic illustration of an exemplary intermediate mask 500 generated from color variation values determined for a given bounding box, such as box 402. Mask 500, like its corresponding bounding box, has a top edge 502a, right and left edges 502b, 502c and a bottom edge 502d. As shown, because most of the computed color variation values were at or below the threshold, the majority of mask values making up the mask 500 are de-asserted, e.g., black in appearance. However, there are first and second areas 504 and 506 whose corresponding color variation values were above the threshold, and are thus asserted, e.g., white in appearance. To determine whether there are occurrences of red-eye, engine 204 preferably checks to see whether there are just two asserted areas, e.g., areas 504, 506, and also that the two asserted areas are generally located where the pupils of a human face would be expected to be found within the corresponding bounding box 402. Those skilled in the art will recognize that numerous criteria could be chosen to make such as determination.

For example, engine 204 may iterate through the mask values until it finds a mask value that has been asserted. It may then consider the surrounding mask values to see whether there is an area of asserted mask values, e.g., first area 504, that is approximately some distance, L, down from the top edge 502a and is some distance, M, in from the left edge 502b that would generally correspond to the location of an eye, knowing that the bounding box encompassed a face. If the first area 504 meets these criteria, engine 402 might then look for another asserted area, e.g., second area 506, that is roughly the same distance, L, down from the top edge 402a, and is spaced some distance, S, from the first area 504. Engine 204 may also determine whether the first and second areas 504, 506 are roughly the expected shape, e.g., generally round, and expected size for eyes and/or pupils. If the two areas 504, 506 satisfy all of these criteria and there are no other significant areas of asserted mask values, then engine 204 concludes that it has found two occurrences of red-eye within the bounding box. A "significant" area of asserted mask values means a clump that is larger than three or four mask values by three or four mask values. Basically, the goal is to ignore occasional occurrences of one or two asserted mask values that are typically a result of noise in the image, but to consider any areas that are larger than about four mask values by four mask values.

If the asserted areas 504, 506 of the intermediate mask 500 satisfy the predefined criteria for occurrences of red-eye, the response to decision block 316 is yes. In this case, the intermediate mask 500 would be considered to be the detection mask for the bounding box being analyzed, as indicated at block 317, and processing would return to decision block 308 to see whether there are other bounding boxes to be analyzed. In other words, no further metrics would be calculated for this bounding box. If the asserted areas of the mask 500 fail any of the established criteria, e.g., too large, too close together, wrong location, wrong shape, no asserted areas, etc., then engine 204 concludes that the color variation mask 500 does not reveal an occurrence of red-eye, and the response to decision block 316 is no. In this case, engine 204 proceeds to compute another metric for each pixel of the subject bounding box, as indicated by No arrow 318 leading to block 320 (FIG. 3B). In the illustrative embodiment, the second metric to be computed is redness.

Redness Metric

Not surprisingly, occurrences of red-eye are also often associated with pixels having high red values. The redness metric is a measure of the redness of each pixel within the bounding box being processed. However, as shown above, redness is preferably not the first or only metric used to detect occurrences of red-eye. Additionally, in the preferred embodiment, the redness metric is not simply equal to or a function of just the pixel's Red value as measured in RGB color space. Instead, the redness metric for a pixel at coordinates x,y is preferably computed from the following equation:

$$\text{Redness}(x, y) = \frac{R(x, y)^2}{G(x, y)^2 + B(x, y)^2 + K}$$

where R, G and B are the corresponding values of the pixel in RGB color space and K is a selected constant, which may be in the range of 13–15, e.g., 14, for 8-bit color pixels. That is, the redness metric is a function of the pixel's Red, Green and Blue values.

In YUV color space, the redness metric of a pixel at location x,y can be computed from the following equation:

$$\text{Redness}(x, y) = \frac{(3Y(x, y) + 4V(x, y))^2}{(3Y(x, y) - U(x, y) - 2V(x, y))^2 + (3Y(x, y) + 5U(x, y))^2 + 90}$$

Those skilled in the art will recognize that a similar redness metric may be computed in other color spaces.

In the preferred embodiment, the computed redness metrics are normalized to fall within the range of 0.0 to 1.0. Next, a redness intermediate mask is generated based on the product of the color variation mask and the computed redness metric values, as indicated at block 322. That is, for each subject pixel, the color variation mask, e.g., "0" or "1", is multiplied by the computed redness metric. The result of this multiplication step is then compared to a preselected threshold in order to generate the intermediate mask. As with the color variation mask, the redness mask has a 1-bit mask value for each pixel within the bounding box being processed, and is organized or arrayed so as to conform the bounding box. The normalized redness metric values are compared to the preselected threshold to determine whether the corresponding mask value should be asserted or de-asserted. As with the color variation mask, the redness threshold is also in the range of 0.5 to 1.0, is preferably about two-thirds, and is more preferably 0.75. For those normalized redness metric values that exceed the threshold, the corresponding mask values are asserted, e.g., set to "1". Similarly, for those redness metric values which equal or fall below the threshold, the corresponding mask values are de-asserted, e.g., set to "0". Accordingly, an intermediate redness mask that is similar to color variation mask 500 (FIG. 5) is created based upon the computed redness metric values.

In nearly all cases, the color variation mask 500 reveals the occurrences of red-eye in the input image 214. However, in some cases the color variation mask 500 includes more than just two eye and/or pupil sized asserted areas, and is thus insufficient on its own to detect occurrences of red-eye. Nonetheless, as the color variation mask nearly always identifies the occurrences of red-eye, the color variation mask is used like a filter on the remaining metrics, as indicated at block 322. In other words, only those pixels whose corresponding color variation mask values are asserted will have a chance to exceed the respective threshold during formation of the redness, redness variation and glint intermediate masks. Those pixels whose corresponding color variation mask values are de-asserted will have their redness, redness variation and glint metric values set to zero before formation of the respective intermediate masks.

Nonetheless, it should be understood that the redness and other intermediate masks could be generated based solely on a comparison of the computed redness metric values and the respective threshold, i.e., without forming a product of the color variation mask and the redness metric values.

Engine 204 then evaluates the new intermediate mask that was formed from subjecting the product of the color variation mask and the redness metric values to the redness threshold to see whether it reveals any occurrences of red-eye, as indicated by decision block 324. The same process as described above in connection with decision block 316 (FIG. 3A) is preferably used at decision block 324 (FIG. 3B). That is, engine 204 searches the new intermediate mask for two eye-sized regions that are generally situated in the expected places for eyes and/or pupils. If it does find such regions, then the engine 206 considers the new intermediate mask as the detection mask for the bounding box being processed, as indicated by Yes arrow 326 and jump block 328, which lead to block 330 (FIG. 3C). Engine 204 also increments the variable, i, by one, as indicated at block 332, whereupon processing is returned to block 308 (FIG. 3A), as indicated by jump block 334. And, in accordance with decision block 308, engine 204 determines whether there is at least one more bounding box to be analyzed.

If the new intermediate mask created at block 322 does not reveal any occurrence of red-eye, then engine 204 determines whether there are any more metrics that can be computed for the pixels of the current bounding box, as indicated by decision block 336 (FIG. 3B). If there are one or more metrics that can still be computed, then processing returns to block 320 as indicated by Yes arrow 338. Suppose the new intermediate mask resulting from the product of the color variation mask and the redness metric values did not reveal any occurrence of red-eye. As there are preferably four different metrics that can be calculated, the answer to decision block 338 is Yes and the next metric is computed. In the preferred embodiment, the next metric after color variation and redness, is redness variation.

Redness Variation Metric

Oftentimes, a red-eye occurrence or artifact is apparent to an observer of an image, at least in part, because the red-eye is surrounded by pixels of a different degree of redness. That is, there is an oscillation in the redness measure at the occurrence of red-eye. As described herein, the redness variation metric assigns a value to this oscillation in the redness measure. Specifically, referring to FIG. 4, the height, D, of an eye 406, which oftentimes corresponds to the diameter of a pupil, generally falls between 5–8% of the height of the bounding box 402 as measured along the y-axis 405. Accordingly, the minimum and maximum expected frequency of oscillation in the change in redness of pixels moving along the y-axis 405 are given by the following equations:

Minimum expected frequency=1/(maximum pupil height)=1/(0.08*bounding box height)=12.5/(bounding box height)

Maximum expected frequency=1/(minimum pupil height)=1/(0.05*bounding box height)=20/(bounding box height)

Engine 204 preferably generates a signal by sampling the pixel values corresponding to a given x-coordinate value, i.e., the pixel values along a single vertical pass, or strip, through the image inside the bounding box 402 (FIG. 4), such as vertical pass 414. This signal is passed through a band-pass filter set at the above-described maximum and minimum expected frequencies. As the signals being evaluated, e.g., the vertical passes, are relatively short, the band-pass filter is preferably designed to accentuate frequencies within the designated range and to attenuate frequencies outside of the designated range. The redness variation metric value for a given pixel, moreover, is the energy of the filtered signal, e.g., the vertical pass, at the location of the given pixel. The value is then normalized so as to fall between 0.0 and 1.0. The preferred sampling rate is one sample per pixel.

This process is represented by the following equation which calculates redness variation:

Redness Variation$(x,y)$=|redness$(x,y)$*g$(x,y)$|$^2$=|redness$(x,y)$*g$(y)$|$^2$ where redness(x,y) is the respective pixel's R value in RGB color space and g(y) represents a function corresponding to a digital Finite Impulse Response (FIR) filter derived in accordance with the technique described in J. McClellan, T. Parks and L. Rabiner, "A Computer Program for Designing Optimum FIR Linear Phase Digital Filters", IEEE Transactions on Audio Electronics, Vol. AU-21, pp. 506–526 (December 1973), which is hereby incorporated by reference in its entirety.

Next, a redness variation intermediate mask is generated based on the product of the color variation mask values and the computed redness variation metric values, as indicated at block 322. More specifically, the computed redness variation metric values are normalized to fall between 0.0 and 1.0, and the normalized values are multiplied by their corresponding color variation mask values. The normalized redness variation metric values resulting from the multiplication step are then compared to a preselected threshold in the range of 0.5 to 1.0, preferably about two-thirds, and more preferably 0.7, to determine whether the corresponding mask value should be asserted or de-asserted. For those redness variation metric values that exceed the preselected threshold, the corresponding mask values are asserted. Similarly, for those redness variation metric values which equal or fall below the threshold, the corresponding mask values are de-asserted. Accordingly, an intermediate mask that is similar to mask 500 (FIG. 5) is created based on the computed redness variation metric values.

Engine 204 then evaluates the new intermediate mask to see whether there is an occurrence of red-eye, as indicated by decision block 324. The same process as described above is preferably used. If an occurrence of red-eye is detected, then the new intermediate mask is selected as the detection mask for the bounding box being analyzed, as indicated at block 330 (FIG. 3C), variable, i, is incremented by one, as indicated at block 332, and processing returns to block 308 (FIG. 3A), as indicated by jump block 334.

If the new intermediate mask still fails to reveal any occurrence of red-eye, then engine 204 determines whether there are any more metrics that can be calculated, as indicated by decision block 336. Suppose the combination of the color variation, redness and redness variation masks did not reveal any occurrence of red-eye. As there are preferably four different metrics that can be calculated, the answer to decision block 336 is Yes. In the preferred embodiment, the last metric calculated by engine 204 is glint.

Glint Metric

Another feature that can be used to detect an occurrence of red-eye is glint. Glint is a small, bright reflection off the surface of an eye, typically, at or near the pupil, from the light of a camera's flash. Glint is relatively small, occurs at the expected location of the eyes and constitutes a sharp change in signal level. For most images, the glint at each eye is generally larger in size than a single pixel. Preferably, a lowpass-filtered version of the Laplacian is computed over either the R or Y channels of the pixels within the bounding box to detect glint. The Laplacian is a two-dimensional (2D) isotropic measure of the second spatial derivative of an image. It may be given by:

$d^2/dx^2 + d^2/dy^2$

The lowpass filter is used to smooth the image thereby reducing the Laplacian's sensitivity to noise in the image. Calculation of the glint metric for a given pixel is preferably given by the following equation:

glint$(x,y)$=[$-\nabla^2 Y(x,y)$]*h$(x,y)$ where, $\nabla$ is the well-known gradient operator and h(x,y) is the lowpass or smoothening filter. A suitable filter for use with the present invention is given by the following table:

| | | |
|---|---|---|
| 1/9 | 1/9 | 1/9 |
| 1/9 | 1/9 | 1/9 |
| 1/9 | 1/9 | 1/9 |

In the above equation for glint, the "*" symbol represents convolution and not multiplication as in the previously described equations.

Those skilled in the art will recognize that other filters besides the above mentioned filter of 1/9's may be utilized.

After calculating the glint metric values for the pixels in the bounding box and normalizing them to fall within the range of 0.0 to 1.0, engine 204 generates an intermediate mask based on a product of the color variation mask values and these calculated glint metric values, as indicated at block 322. More specifically, the glint metric values resulting from the multiplication with the corresponding color variation mask values are subjected to a preselected threshold which, as described above, is in the range of 0.5 to 1.0, is preferably two-thirds, and is more preferably 0.75. For those glint metric values that exceed the threshold, the corresponding mask values are asserted, and for those glint metric values that equal or fall below the threshold, the corresponding mask values are de-asserted. Accordingly, an intermediate mask that is similar to mask 500 (FIG. 5) is created based on the computed and thresholded glint metric values.

Engine 204 then evaluates the new intermediate mask to see whether there is an occurrence of red-eye, as indicated by decision block 324. The same process as described above is preferably used. If an occurrence of red-eye is detected, then engine 204 considers the new intermediate mask to be the detection mask for the bounding box being analyzed, as indicated at block 330 (FIG. 3C). In addition, the variable, i, is incremented by one, as indicated at block 332, and processing returns to block 308 (FIG. 3A), as indicated by jump block 334, to determine whether there are additional bounding boxes to be analyzed.

If the glint intermediate mask still fails to reveal the occurrence of red-eye, then engine 204 determines whether there are any more metrics that can be calculated, as indicated by decision block 336 (FIG. 3B). As engine 204 has already computed four metrics, there are no additional metrics that can be computed. In this case, engine 204 forms a composite intermediate mask based upon a Boolean product of all of the prior masks, as indicated by No arrow 340 leading to block 342. As described above, engine 204 has generated four intermediate masks: a color variation mask, a redness mask, a redness variation mask and a glint mask, each having 1-bit mask values. For each x,y position in the four masks, the corresponding mask values from all four intermediate masks are ANDed together to form a new mask value which is assigned to the composite mask. In this manner, only if mask values from all four intermediate masks are asserted will the corresponding mask value for the composite mask be asserted. If one or more of the mask values are de-asserted, then the mask value of the composite mask will be de-asserted.

Engine 204 the evaluates the composite mask to see whether it reveals any occurrences of red-eye, as indicated at decision block 344 (FIG. 3B). The same process as described above in connection with decision block 316 (FIG. 3A) is preferably used at decision block 344 as well. If engine 204 finds an occurrence of red-eye, then it considers the composite intermediate mask as the detection mask for the bounding box being processed, as indicated by Yes arrow 326 leading via jump block 328 to block 330 (FIG. 3C). And, engine 304 increments the variable, i, by one, as indicated at block 332, and determines whether there is at least one more bounding box to be analyzed.

In this case, engine 204 concludes that there is no occurrence of red-eye in the bounding box being processed, as indicated by No arrow 338 leading to block 340. Engine 204 then increments the variable, i, by one, as indicated by block 328 and returns to block 308 (FIG. 3A) to see whether there are any more bounding boxes to be processed.

If the composite intermediate mask still fails to reveal the occurrence of red-eye, then engine 204 concludes that there is no occurrence of red-eye in the bounding box being processed, as indicated by No arrow 346 leading via jump block 348 to block 350.

Engine 204 then increments the variable, i, by one, as indicated by block 332 and returns to block 308 (FIG. 3A) to see whether there are any more bounding boxes to be processed.

Once all of the bounding boxes of the input image 214 have been processed, the response at decision block 308 (FIG. 3A) is Yes. At this point, engine 204 supplies the detection mask for each bounding box in which an occurrence of red-eye was detected along with the input image 214 to the red-eye correction engine 206 for further processing, as indicated at block 342. Engine 204 may also supply the red-eye correction engine 206 with the bounding box coordinates as well. As described below, the red-eye correction engine 206 proceeds to correct each detected occurrence of red-eye within the input image 214.

Red-Eye Correction

Basically, the red-eye correction engine 206 generates a correction mask for the input image 214. Unlike the detection masks described above, the values of the correction mask range from 0.0 to 1.0, e.g., 0.2, 0.65, etc. Once the correction mask is generated, the de-saturator 212 of the red-eye-correction engine 206 formulates the output image 216 by correcting the YUV values of the input image pixels as follows:

$$Y(x,y)_{corrected} = Y(x,y)_{original}$$

$$Cr(x,y)_{corrected} = (1-\text{Correction\_Mask}(x,y))*Cr_{original}$$

$$Cb(x,y)_{corrected} = (1-\text{Correction\_Mask}(x,y))*Cb_{original}$$

Figure 6A:
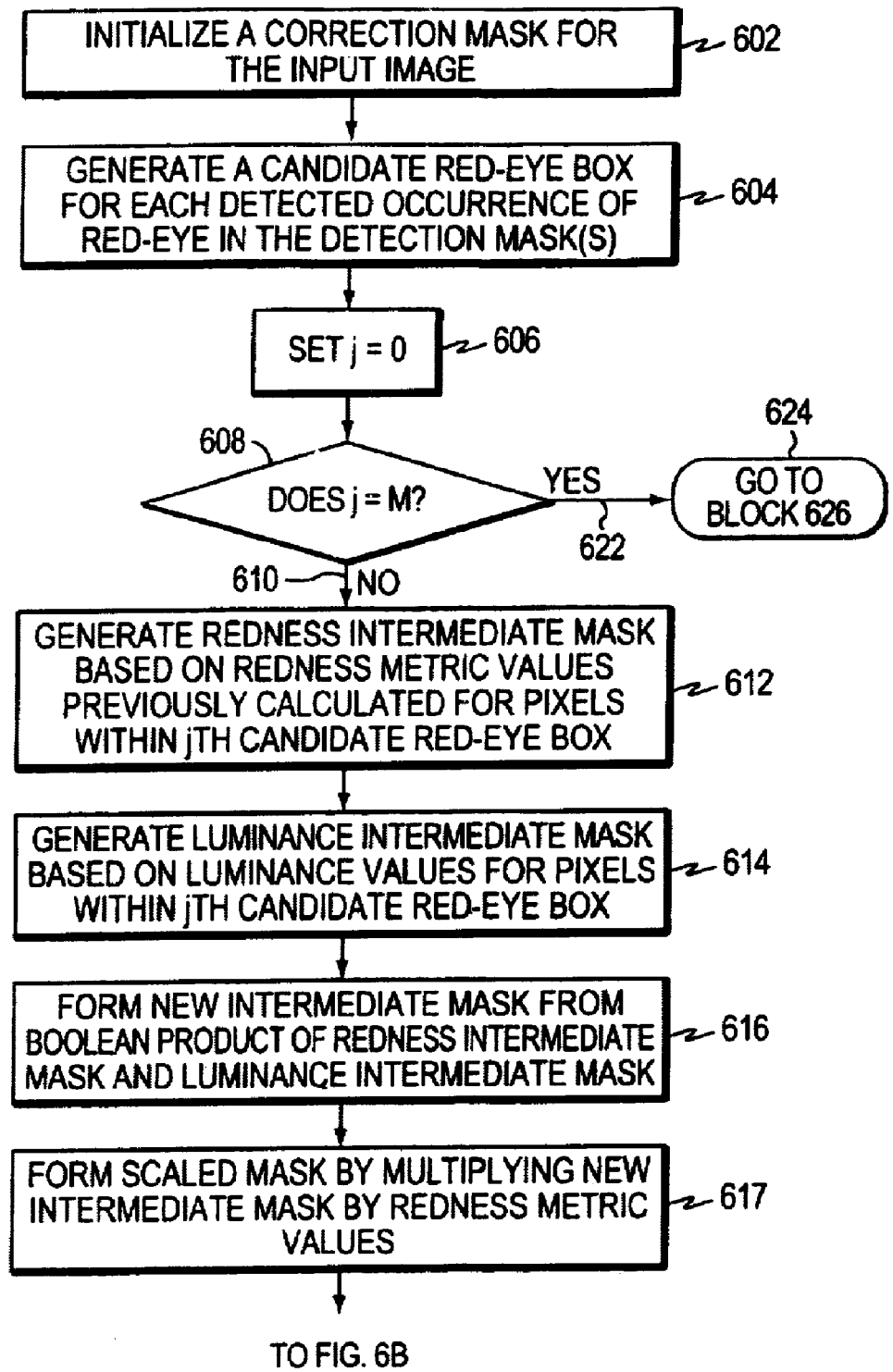
Figure 6B:
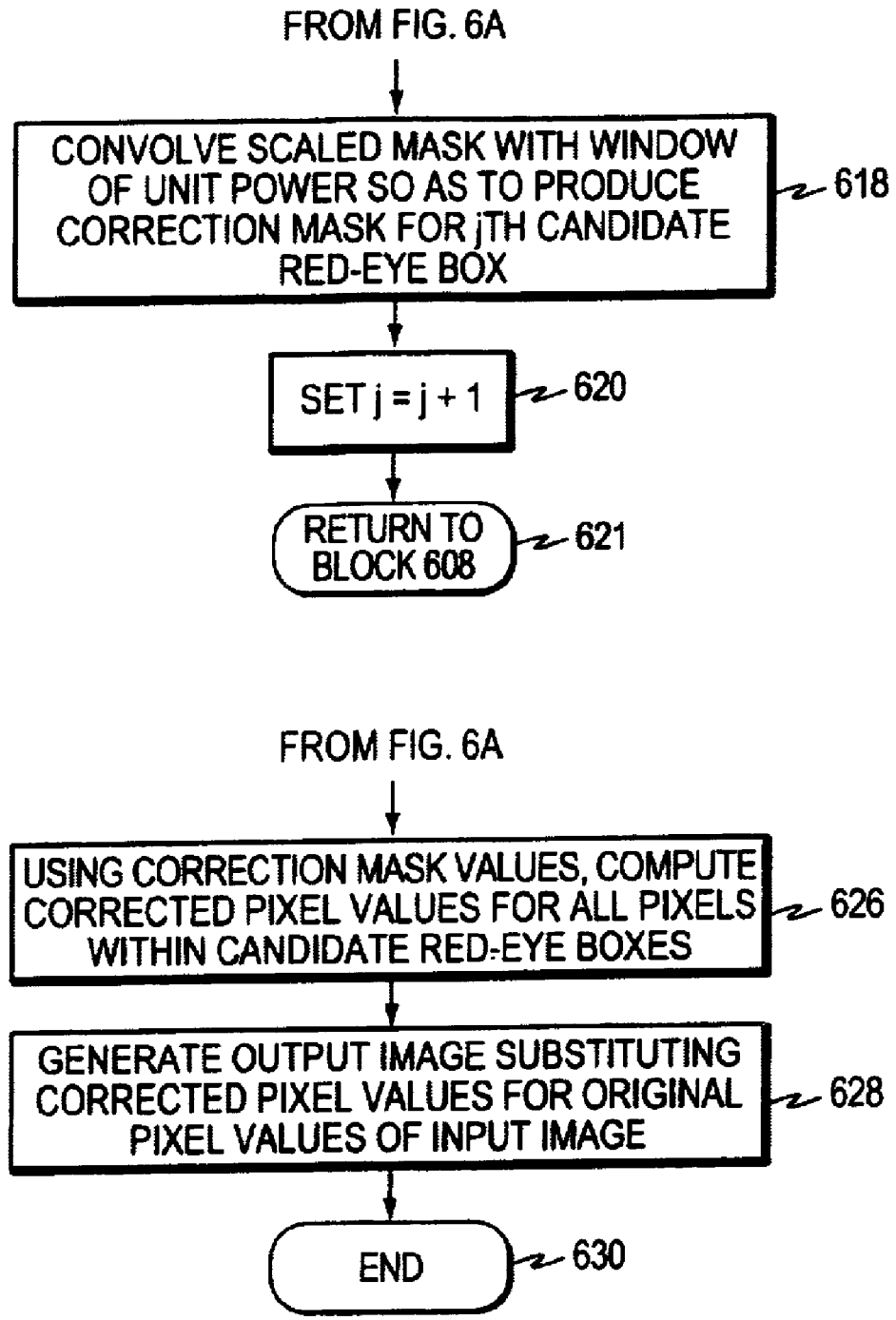
Figure 7:
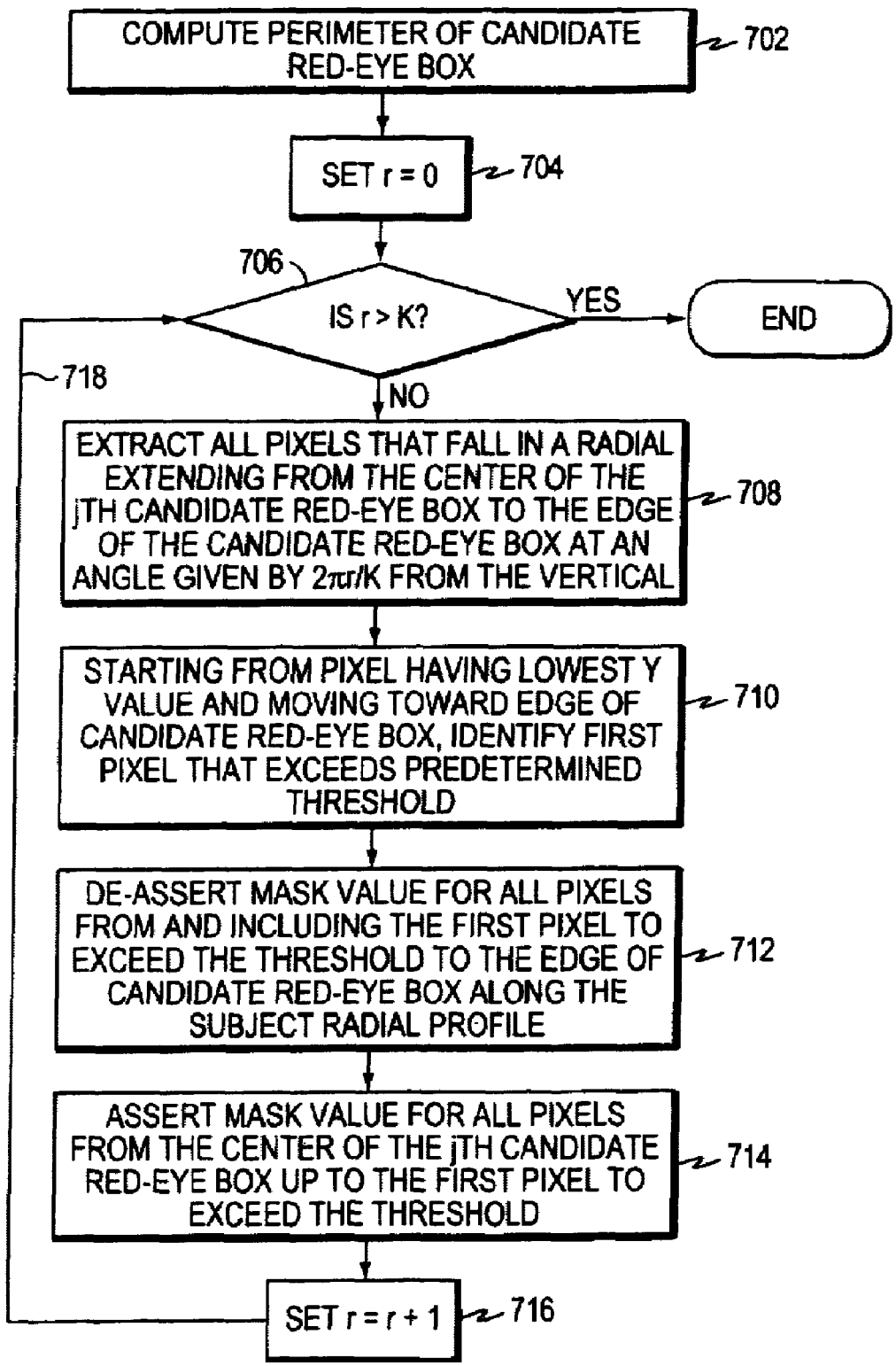

FIGS. 6A–B and 7 are flow diagrams of the steps performed by the red-eye correction engine 206 in generating the correction mask and in creating the corrected output image 216. First, engine 206 initializes a correction mask comprising a plurality of correction mask values for each bounding box 402 having a detected occurrence of red-eye such that each pixel of the respective bounding box has a corresponding correction mask value, as indicated at block 602. Preferably, the correction mask values are all de-asserted, e.g., set to "0". Next, engine 206 forms a candidate red-eye box around each red-eye occurrence area that was detected by the red-eye locator engine 204, as indicated at block 604. In the illustrative embodiment, each candidate red-eye box is a rectangle or square patch whose sides are generally parallel to the sides of the input image 214, and which fully encloses an area corresponding to a detected red-eye occurrence, such as square patch 508 (FIG. 5) which surrounds red-eye occurrence area 506. The square patch 508 is preferably centered with respect to the maximum coordinate in the vicinity of the red-eye pixels of the respective area 506, and is sized so that all of the asserted pixels of the area 506 are inside the patch 508. That is, the center of the candidate red-eye box corresponds to the center of the clump or area of asserted mask values. Those skilled in the art will recognize that there are numerous methods available for estimating the location of this center, which is intended to correspond to the center of the eye.

Engine 206 then sets a variable, e.g., j, to zero, as indicated by block 606. Next, engine 206 tests whether j equals "M" where M is set to the number of candidate red-eye boxes, as indicated at decision block 608. If not, then there is at least one more candidate red-eye box to processed. In this case, engine 206 first generates a redness intermediate mask for the current red-eye candidate box using the redness metric values previously computed, as indicated by No arrow 610 leading to block 612. More specifically, engine 206 creates a redness intermediate mask having a 1-bit mask value for each pixel of the red-eye candidate box being processed. For those pixels whose previously computed, normalized redness metric value exceeds a predetermined threshold, preferably in the range of 0.1 to 0.5 and specifically 0.3, the corresponding mask value is asserted, e.g., set to "1". For those pixels whose previously computed, normalized redness metric value is is equal to or less than the predetermined threshold, the corresponding mask value is de-asserted, e.g., set to "0". Engine 206 also generates an intermediate mask that is based on the luminance of the pixels within the red-eye candidate box being processed, as indicated at block 614.

FIG. 7 is a flow diagram of the preferred steps in generating the luminance intermediate mask. First, engine 206 determines the size, K, of the perimeter of the candidate red-eye box currently being processed, as indicated at block 702. That is, assuming the box is a rectangle, engine 206 determines the width and height of the box (in pixels), adds these two values together and multiples the result by two. This provides the engine 206 with the number of pixels that make up the perimeter of the current box. Engine 206 then sets a variable, r, to zero, as indicated at block 704, and determines whether r is greater than the number of pixels that make up the box's perimeter, i.e., K, as indicated at decision block 706. If not, engine 206 extracts all of the pixels from the current candidate red-eye box being processed that lie along a radial extending from the center of the box at an angle equal to $2\pi r/K$ from the vertical, as indicated at block 708.

Figure 8:
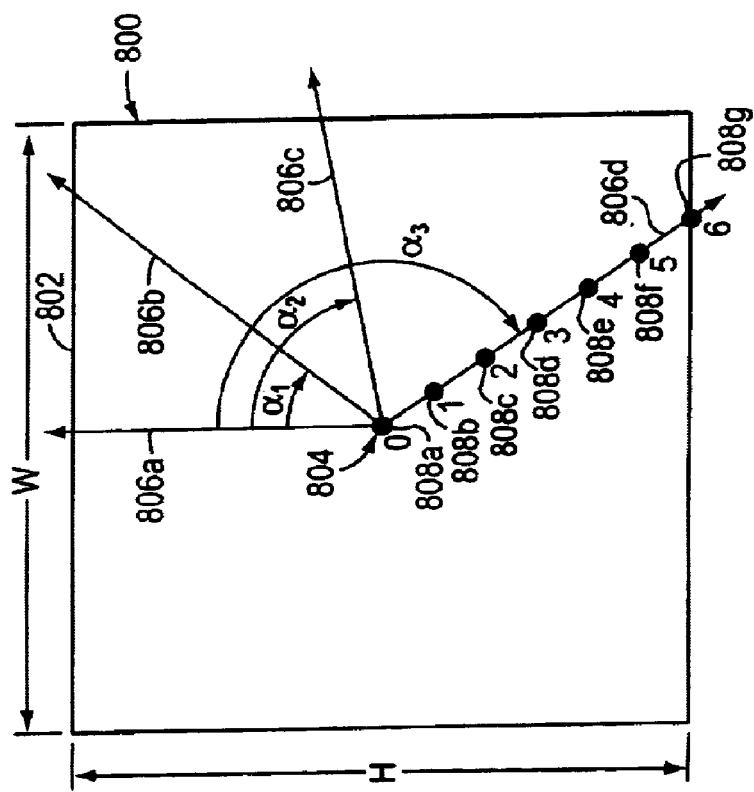
FIG. 8 is a highly schematic illustration of a candidate red-eye box including a plurality of radials.

This may best be explained with a figure. FIG. 8 is a highly schematic illustration of a candidate red-eye box 800. Box 800 has a perimeter 802 that can be determined from its height, H, and width, W, as described above. Box 800 also includes a center 804. Extending from the center 804 of the box are a plurality of radials, such as radials 806a–d. Each radial, moreover, is at an angle from a vertical axis running through the box. Radial 806a, for example, is zero degrees from the vertical axis. That is, radial 806a is along the vertical axis. Radial 806b is at an angle, $\alpha_2$, from the vertical, radial 806c is at an angle, $\alpha_2$, from the vertical and radial 806d is at an angle, $\alpha_3$, from the vertical. Considering radial 806d, there are seven pixels 808a–g (also identified as pixels 0–6) that fall along this radial 806d. For radial 806d, it would be these seven pixels 808a–g that are extracted at step 708.

Figure 9:
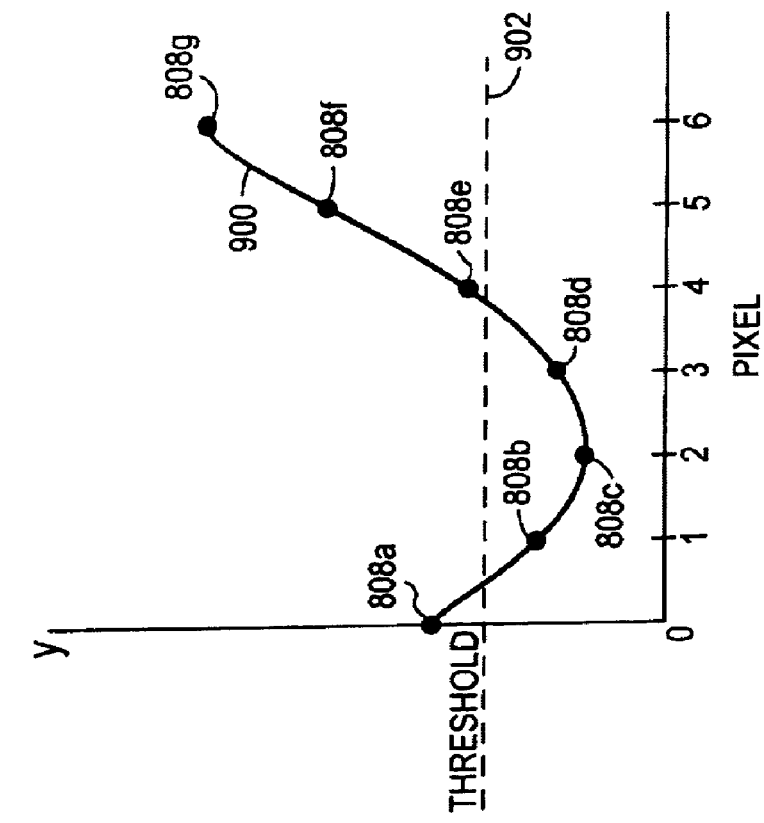
FIG. 9 is a highly schematic plot of a luminance profile from the candidate red-eye box of FIG. 8.

After extracting the pixels located along the subject radial, engine 206 identifies the first pixel that exceeds a predetermined luminance threshold, starting with the pixel having the lowest luminance or Y value, and moving in a direction toward the pixel at the box's perimeter, i.e., the last pixel of the profile, as indicated at block 710. To perform this step, engine 206 may plot, at least logically, the luminance values of the extracted pixels. FIG. 9 is a highly schematic plot 900 of luminance values versus distance along the radial for the pixels of radial 806d. Engine 206 determines which pixel in the plot 900 has the lowest luminance value, i.e., pixel 808c. Starting at pixel 808c and moving toward the last pixel in the profile, i.e., pixel 808g, engine 206 looks for the first pixel that exceeds the predetermined luminance threshold represented by the dashed line 902. In this example, pixel 808e is the first whose luminance value exceeds the threshold 902. In other words, starting with the pixel having the lowest luminance value, engine 206 looks for the first pixel to exceed the luminance threshold moving in a direction toward the last pixel in the profile, i.e., toward the edge of the candidate red-eye box.

With luminance values normalized to fall between 0.0 and 1.0, the luminance threshold 902 is approximately 0.4

Within the luminance mask, engine 206 de-asserts, e.g., sets to "0", the mask values corresponding to the pixels identified as having exceeded the luminance threshold, as indicated at block 710 (FIG. 7). That is, engine 206 de-asserts the first pixel, e.g., pixel 808e, found to exceed the luminance threshold, and all other pixels further out along the radial from the first threshold exceeding pixel, e.g., pixels 808f and 808g. Engine 206 also asserts, e.g., sets to "1", the mask value for all the pixels from and including the first pixel in the profile, i.e., pixel 808a, up to but not including the first threshold exceeding pixel, e.g., pixels 808a–808d, as indicated at block 714. The variable r is then incremented by one, as indicated at block 716, and processing returns to decision block 706, as indicated by arrow 718. In this way, engine 206 generates radial profiles all the way around center 804 of box 802, and mask values for all of the pixels within the box 802.

Returning to FIG. 6A, after generating a luminance mask for the candidate red-eye box currently being processed, engine 206 forms a new intermediate mask from a Boolean product, i.e., an AND operation, of the redness mask and the luminance mask, as indicated at block 616. Engine 206 then forms a scaled mask by multiplying the new intermediate mask by the previously computed redness metric values, as indicated at block 617. The intermediate mask values are 1 or 0, while the redness metric values were normalized to fall between 0.0 and 1.0. Accordingly, the scaled mask has values falling between 0.0 and 1.0.

Next, engine 206 convolves the scaled mask with a window of unit power, thereby producing a correction mask for the candidate red-eye box currently being processed, as indicated at block 618 (FIG. 6B). A suitable window of unit power is shown below:

| | | | | |
|---|---|---|---|---|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

Another suitable window of unit power, which approximates the Gaussian, is:

| | | | | |
|---|---|---|---|---|
| 0.0003 | 0.0053 | 0.0144 | 0.0053 | 0.0003 |
| 0.0053 | 0.1065 | 0.2894 | 0.1065 | 0.0053 |
| 0.0144 | 0.2894 | 0.7866 | 0.2894 | 0.0144 |
| 0.0053 | 0.1065 | 0.2894 | 0.1065 | 0.0053 |
| 0.0003 | 0.0053 | 0.0144 | 0.0053 | 0.0003 |

Upon generating the correction mask for the current candidate red-eye box, engine 206 increments the variable j by one, as indicated at block 620. Processing then returns via jump block 621 to block 606 (FIG. 6A), where engine 206 determines whether there are additional candidate red-eye boxes to process. If all of the candidate red-eye boxes have been processed, the response to decision block 608 is yes. In this case, processing moves via Yes arrow 622 and jump block 624 to block 626 (FIG. 6B) where the de-saturator 209 of engine 206 computes corrected pixels values for all pixels within the candidate red-eye boxes using the previously computed correction masks. As mentioned above, the corrected pixel values are computed as follows:

$Y(x,y)_{corrected} = Y(x,y)_{original}$ $Cr(x,y)_{corrected} = (1 - \text{Correction\_Mask}(x,y)) * Cr_{original}$ $Cb(x,y)_{corrected} = (1 - \text{Correction\_Mask}(x,y)) * Cb_{original}$ Engine 206 generates the output image 216 by replacing the original pixel values with corrected pixel values, as indicated at block 628. At this point, processing by the red-eye correction system 200 is complete, as indicated by block 630. The output image 216 may then be printed from printer 106. The pixels of the output image may be converted from YUV color space back to RGB color space prior to printing or display, as necessary.

It should be understood that the criteria utilized to determine whether the mask reveals an occurrence of red-eye may be selected so as to respond to an occurrence of red-eye at a single eye as opposed to both eyes.

It should be further understood that the metrics may be computed in other orders.

It should also be understood that rather than generate a single detection mask for the entire input image 214, the detection mask builder 208 could be configured to build a separate detection mask for each of the bounding boxes.

Summed Area Tables

To increase the speed of the detection and correction process, system 200 preferably pre-calculates a plurality of summed area table values for computing averages over bitplanes. More specifically, the red-eye locator engine 204 pre-calculates summed area tables for the YUV values corresponding to the pixels within each bounding box 402. The summed area table values are pre-calculated in accordance with the technique described in F. Crow, "Summed-Area Tables for Texture Mapping", Computer Graphics, Vol. 18, No. 3 (July 1984) (© 1984 ACM), pp. 207–212, which is hereby incorporated by reference in its entirety.

To compute the average over a patch of N×N pixels without using the summed area table technique would require $N^2$ arithmetic operations. However, if the summed area table technique is used, only five arithmetic operations are required. Thus, the use of summed area tables substantially speeds up the process of computing the above described metrics.

For the color variation metric, for example, a $Y_{sum}$ value is initially calculated for each pixel of a bounding box, e.g., bounding box 402. Each sum value corresponds to the sum of all Y values in a box whose lower left corner is the lower left corner 402c of the bounding box 402, and whose upper right corner is the respective pixel. In a bounding box that is 100 pixels by 100 pixels, each $Y_{sum}$ can be computed with two addition operations using recursion. Once the $Y_{sum}$ values have been computed, $Y_{mean}$ for any rectangle having coordinates $x_{right}$, $x_{left}$, $y_{top}$ and $y_{bottom}$ within the bounding box 402 can be easily computed from the following equation:

$$Y_{mean}(x, y) = \frac{[Y_{sum}(x_{right}, y_{top}) - Y_{sum}(x_{right}, y_{bottom}) - Y_{sum}(x_{left}, y_{top}) + Y_{sum}(x_{left}, y_{bottom})]}{(\text{number of pixels in rectangle})}$$

As shown, this equation requires only two subtractions, one addition and one division per pixel. Furthermore, the number of operations remains constant regardless of the size of the rectangle.

In a similar manner, $Cr_{sum}$ values and $Cb_{sum}$ values are also calculated for each pixel of the bounding box 402, thereby allowing $Cr_{mean}$ and $Cb_{mean}$ values to be rapidly calculated.

The foregoing description has been directed to specific embodiments of the present invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A system for detecting and correcting red-eye in an image without user intervention, the system comprising:

a face recognition and location engine configured to identify one or more faces within the image, wherein at least a portion of the image is in the chrominance-luminance color space;

a red-eye locator engine configured to detect an occurrence of red-eye within the one or more identified faces, wherein the red-eye locator engine computes a color variation metric value for a given pixel of an identified face by computing a mean luminance-chrominance value for a patch of pixels centered on the given pixel, a squared distance between the luminance-chrominance value of the given pixel and the computed mean luminance-chrominance value for the patch, and an average of the squared distances within a region centered on the given pixel; and a red-eye correction engine configured to correct the detected occurrences of red-eye within the image, wherein the red-eye locator engine detects an occurrence of red-eye based upon one or more metrics computed for one or more identified faces, the one or more metrics including a color variation metric tat corresponds to a change in color within a given area, the color variation metric corresponds to a change in both luminance and chrominance within the given area.

2. The system of claim 1 wherein the size of the patch corresponds to an expected size of a pupil of the respective face, and the size of the region corresponds to an expected size of an eye of the respective face.

3. The system of claim 2 wherein the face recognition and location engine is further configured to place a bounding box around each identified face, and the expected sizes of the pupil and the eye are a function of the size of the bounding box.

4. The system of claim 3 wherein the red-eye locator engine is further configured to generate a mask for an identified face, the mask having 1-bit mask values that are set by comparing the computed color variation metric values to a predetermined threshold, and the red eye-locator engine searches the mask to locate one or more occurrences of red-eye.

5. The system of claim 4 wherein each mask value corresponds to a pixel of the identified face, a mask value is asserted if the color variation metric for the corresponding pixel exceeds the threshold, otherwise the mask value is de-asserted, and the predetermined threshold is in the range of 0.5 to 1.0 for color variation metric values normalized between 0.0 and 1.0

6. The system of claim 5 wherein the red-eye locator engine searches the mask for occurrences of red-eye by determining whether the mask has two generally eye-sized areas of assated mask values, and the eye-sized areas of asserted mask values are at positions expected for eyes of the respective identified face.

7. The system of claim 3 wherein the red-eye correction engine places a candidate red-eye box around each detected occurrence of red-eye, computes a correction value for each pixel within the candidate red-eye box, and de-saturates the chrominance values of at least some of the pixels within the candidate red-eye box based on the computed correction values.

8. The system of claim 7 wherein de-saturation includes attenuating the respective chrominance value while preserving the respective luminance value.

9. The system of claim 7 wherein the correction values are computed as a function of the luminance and redness metric values of the pixels within the candidate red-eye boxes.

10. The system of claim 1 wherein the one or metrics computed by the red-eye locator engine further include a redness metric, a redness variation metric and a glint metric.

11. The system of claim 10 wherein the red-eye locator engine initially relies solely on the mask generated from the computed color variation metric values to detect an occurrence of red-eye.

12. The system of claim 11 wherein the red-eye locator engine computes a redness metric value for at least some of the in a bounding box, provided that the mask generated from the computed color variation metric values failed to reveal any occurrences of red-eye, and generates a redness mask based on a product of the color variation mask and the computed redness metric values.

13. The system of claim 12 wherein each redness mask value corresponds to a pixel of the identified face, a redness mask value is asserted if the product of the color variation mask value and the computed redness metric value for the corresponding pixel exceeds a redness threshold, otherwise the redness mask value is de-asserted, and the redness threshold is in the rage of 0.5 to 1.0 for redness metric values normalized between 0.0 and 1.0.

14. The system of claim 10 wherein the image is in Red (R), Green (G) and Blue (B) color space and the redness metric for the given pixel is given by the following equation:

$$redness = \frac{R^2}{G^2 + B^2 + K}$$

where K is a selected constant.

15. The system of claim 14 wherein K is in the range of approximately 13–15.

16. The system of claim 1 wherein the system is disposed within a printer and is configured to detect and correct occurrences of red-eye within images transmitted to the printer.

17. A method for detecting and correcting red-eye in an image without user intervention, the method comprising the steps of:
identifying one or more faces within the image, wherein at least a portion of the one or more faces are represented by pixels in luminance-chrominance color space;
detecting occurrences of red-eye for an identified face based on one or more metrics computed for at least some of the pixels of the identified face, wherein the detecting comprises the steps of: computing a mean luminance-chrominance value for a patch pixels centered on a given pixel, computing a squared distance between the luminance-chrominance value of the given pixel and the computed mean luminance-chrominance value for the patch, computing an average of the squared distance within a region centered on the given pixel, and assigning the computed average as the color variation metric value for the given pixel; and
correcting the detected occurrences of red-eye, wherein the one or more metrics includes a color variation metric that corresponds to a change in both luminance and chrominance within a given area of the identified face.

18. The method of claim 17 wherein the step of identifying further includes the step of placing a bounding box around each identified face, and the size of the patch corresponds to an expected size of a pupil of the respective face, the size of the region corresponds to an expected size of an eye of the respective face, and the expected sizes of the pupil and the eye are a function of the size of the bounding box.

19. The method of claim 18 wherein the one or more metrics further include a redness metric that is given by the following equation $$redness = \frac{R^2}{G^2 + B^2 + K}$$

where R, G and B correspond to red, green and blue color space values and K is a constant.

20. The method of claim 17 further comprising the step of calculating a plurality of summed area table values for use in optimizing the computation of one or more of the metrics.

* * * * *

UNITED STATES PATENT AND TRADEMARK OFFICE
CERTIFICATE OF CORRECTION

PATENT NO. : 7,155,058 B2
APPLICATION NO. : 10/131173
DATED : December 26, 2006
INVENTOR(S) : Matthew D. Gaubatz et al.

It is certified that error appears in the above-identified patent and that said Letters Patent is hereby corrected as shown below:

On the title page, item (56), under "Other Publications", in column 2, line 10, delete "Neutral" and insert -- Neural --, therefor.

In column 15, line 27, delete "$\alpha_2$," and insert -- $\alpha_1$, --, therefor.

In column 17, line 44, delete "$x_{,right}$," and insert -- $x_{right}$, --, therefor.

In column 18, line 9, in Claim 1, delete "computing" and insert -- computing: --, therefor.

In column 18, line 21, in Claim 1, delete "tat" and insert -- that --, therefor.

In column 18, line 38, in Claim 4, delete "red eye-locator" and insert -- red-eye locator --, therefor.

In column 18, line 48, in Claim 5, delete "1.0" and insert -- 1.0. --, therefor.

In column 18, line 52, in Claim 6, delete "assated" and insert -- asserted --, therefor.

In column 19, line 1, in Claim 10, after "or" insert -- more --.

In column 19, line 2, in Claim 10, delete "farther" and insert -- further --, therefor.

In column 19, line 10, in Claim 12, delete "the in" and insert -- the pixels in --, therefor.

In column 19, line 21, in Claim 13, delete "rage" and insert -- range --, therefor.

In column 19, line 29, in Claim 14, delete "redness" and insert -- Redness --, therefor.

In column 20, line 5, in Claim 17, after "patch" insert -- of --.

UNITED STATES PATENT AND TRADEMARK OFFICE
CERTIFICATE OF CORRECTION

PATENT NO. : 7,155,058 B2
APPLICATION NO. : 10/131173
DATED : December 26, 2006
INVENTOR(S) : Matthew D. Gaubatz et al.

It is certified that error appears in the above-identified patent and that said Letters Patent is hereby corrected as shown below:

In column 20, line 11, in Claim 17, delete "distance" and insert -- distances --, therefor.

In column 20, line 31, in Claim 19, delete "equation" and insert -- equation: --, therefor.

In column 20, line 35, in Claim 19, delete "redness" and insert -- Redness --, therefor.

Signed and Sealed this

Twenty-eighth Day of April, 2009

JOHN DOLL
*Acting Director of the United States Patent and Trademark Office*